Figure 4:
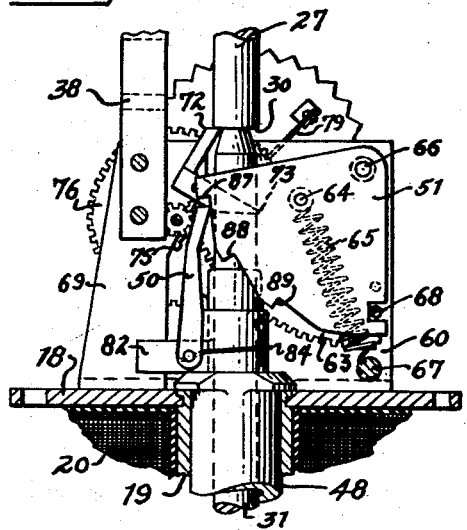

Oct. 26, 1948.  R. H. GERARD ET AL  2,452,233
PERMANENT FAULT ISOLATOR TIME DELAY SWITCH
Filed July 24, 1945  3 Sheets-Sheet 1
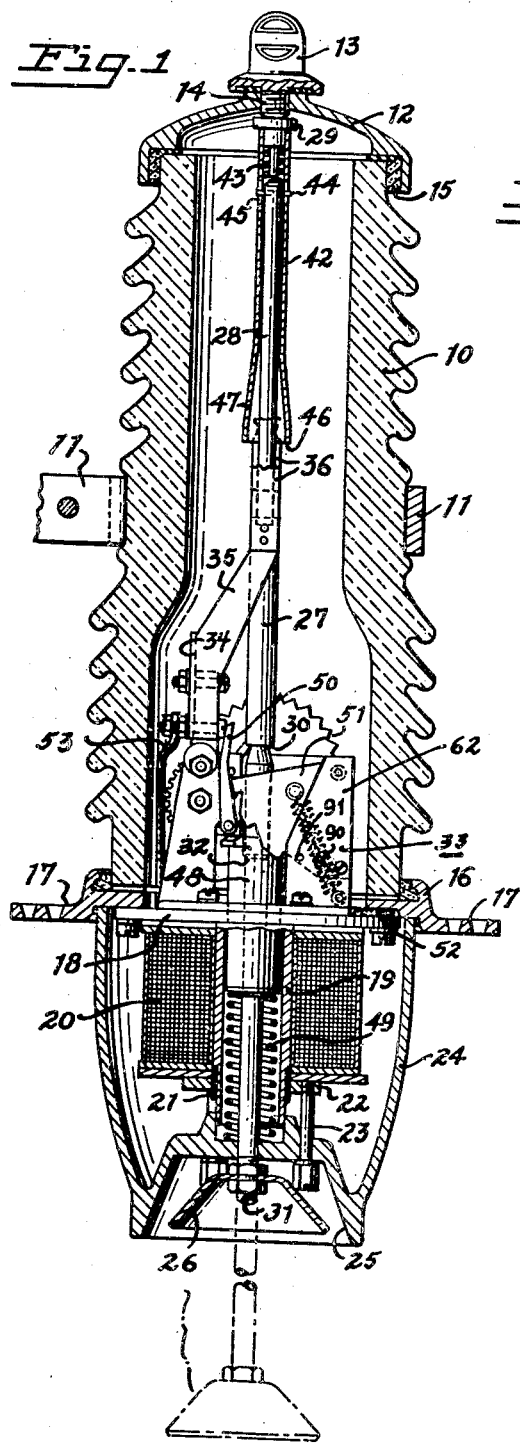
Fig.1
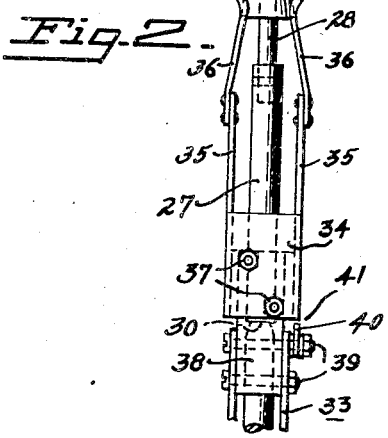
Fig.2
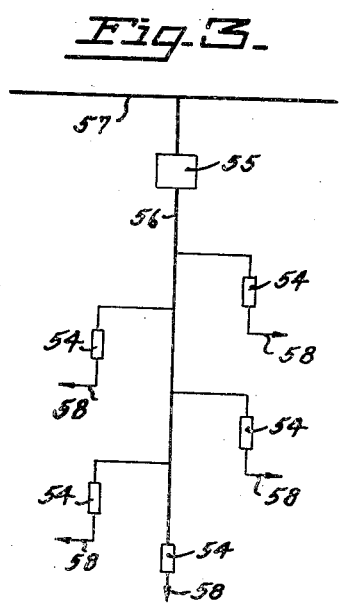
Fig.3
INVENTOR.
ROY H. GERARD AND
ROY M. SMITH.
BY
ATTORNEY Oct. 26, 1948.  R. H. GERARD ET AL  2,452,233
PERMANENT FAULT ISOLATOR TIME DELAY SWITCH
Filed July 24, 1945  3 Sheets-Sheet 2

INVENTOR.
ROY H. GERARD AND
ROY M. SMITH.
BY
ATTORNEY

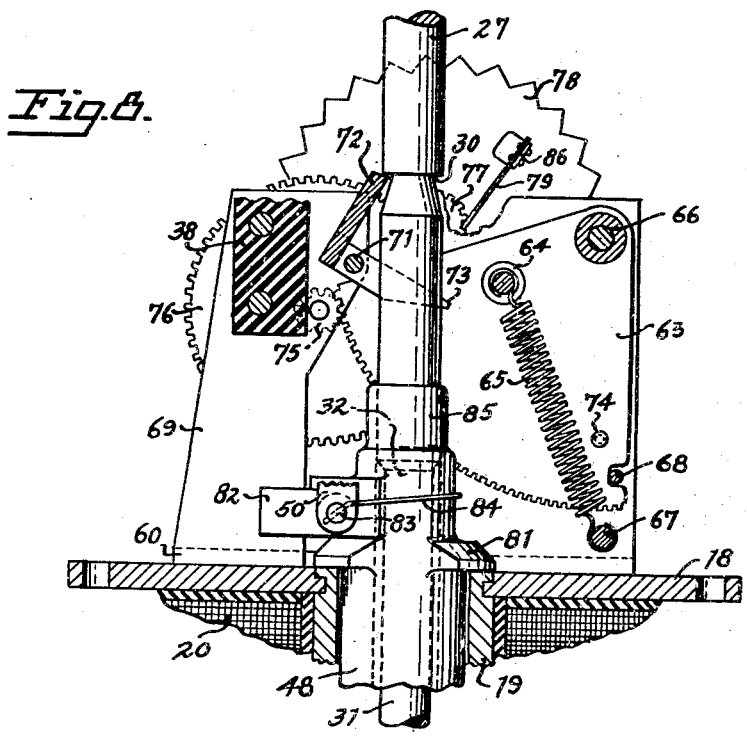
Fig. 8.
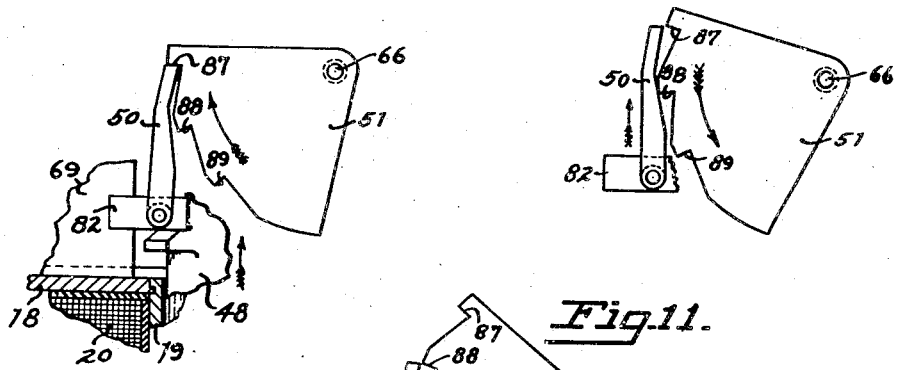
Fig. 9.                    Fig. 10.
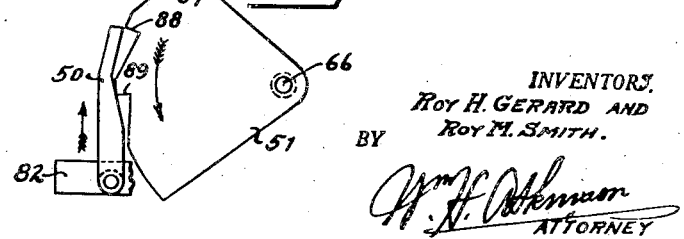
Fig. 11.
INVENTORS.
Roy H. Gerard and
Roy M. Smith.
BY
W. H. Atkinson
ATTORNEY

UNITED STATES PATENT OFFICE 2,452,233

PERMANENT FAULT ISOLATOR TIME-DELAY SWITCH

Roy H. Gerard, Oakland, Calif., and Roy M. Smith, Jeannette, Pa., assignors to Pacific Electric Manufacturing Corporation, San Francisco, Calif., a corporation of California Application July 24, 1945, Serial No. 606,794

4 Claims. (Cl. 200—108)

Our present invention relates to a new and improved circuit isolating device and more particularly to a circuit isolating or disconnecting device that is adapted for use in association with an automatically operating reclosing circuit breaker to disconnect a faulty or overloaded circuit from an electric power distribution system An object of our invention is to provide a simple and inexpensive means, which in the event of a continuing fault or overload condition upon a branch circuit will operate after a predetermined period to disconnect the faulted or overloaded branch circuit from the remaining portion of a power distribution system in a practical and effective manner.

Another object of our invention is to provide an improved circuit disconnecting device for use in conjunction with an automatically operating reclosing circuit breaker of a conventional design, which will operate to disconnect a faulted or overloaded branch line of a distribution system from the remaining portion of the system at a time of zero current as when the reclosing circuit breaker in a main line of the distribution system is open.

In the past, where fault or overload protection of the nature contemplated by our invention has been desired, it was generally the practice to provide a complete reclosing circuit breaker at different points in the system which would operate independently in response to a fault or overloaded condition in that portion of the system. Such an arrangement with a number of such reclosing circuit breakers, each having complicated operating mechanisms, timing relays and oil immersed contacts with arc extinguishing means, rendered such a system expensive and not economically adaptable to rural power distribution systems. It is therefore a further object of our present invention to provide a simple and inexpensive means for a system of power distribution by which a single main reclosing circuit breaker may be operating in conjunction with any number of our improved circuit isolating devices to disconnect any faulty or overloaded branch line circuit from the remaining portion of the distribution system in a new and novel manner.

When a power distribution system is equipped with one or more of our improver zero current circuit isolating devices in association with a reclosing circuit breaker, and a continuing fault or overload occurs on a branch line circuit, the control mechanism of the isolating device of that particular branch will be influenced upon the initial occurrence of said fault or overload condition. At the same time the main reclosing circuit breaker will also respond and open and reclose the main line circuit. Then upon each reclosing operation of the main reclosing circuit breaker, the control mechanism of our device will be further influenced until the device is tripped open, but in these operations our circuit isolating device, unlike a fuse or circuit breaker of the conventional type, will not operate to open its circuit controlling contacts until the reclosing circuit breaker has operated a predetermined number of times. At the same time the control mechanism of our device is such that the opening of its circuit isolating contacts will always occur during a period when the reclosing circuit breaker associated therewith is open and a zero current condition exists upon the circuit. An advantage of this zero current operating feature is that the branch line isolating devices do not require a container of insulating or any expensive arc extinguishing protection such as would be required if its contacts were opened at a time when current is flowing therethrough. If the fault or overload condition is removed from the particular branch line circuit before the reclosing circuit breaker has completed a predetermined portion of its operating cycle, the isolating device will remain closed and reset itself for a similar series of responses should a subsequent fault or overload condition occur upon this particular branch line.

Another advantage of our device and system is that any number of the disconnecting devices may be employed in conjunction with a single reclosing circuit breaker and in this way it will be possible to provide effective fault and overload protection upon any number of branch lines leading from a single main or feeder circuit.

During the above operations of any one of our improved circuit isolating devices in the above manner, it will be understood that the remaining similar devices upon the power distribution system will remain inactive or in their closing circuit position, as it is only when an abnormal current is flowing therethrough that the operating mechanism thereof is brought into action. Therefore, when the main reclosing circuit breaker finally recloses following a circuit isolating operation of the circuit isolating device nearest to the fault in the system, the remaining portion of the system will still be operative to supply electric power through the remaining circuit isolating devices which, as suggested above, will have remained in their normal closed circuit position throughout this particular cycle of operation of also here noted that, in addition to providing a securing means for the electro-magnet or coil 20, the non-metallic sleeve 19 carried by the plate 18 also serves as a guide for a vertically movable cylindrical armature 48 through which the elongated rod-like member 27 is adapted to move. At the same time it will be understood that the armature 48 is also adapted to be moved downwardly and independently of the elongated rod-like member 27 by magnetic attraction when an abnormal current is flowing through the electro-magnet or coil 20, or upwardly when the electro-magnet or coil 20 is deenergized, by means of a compression spring 49 which is seated at its lower end upon the inside of the housing 24. The armature 48 is held against turning about the elongated rod-like member 27, and at one side thereof it carries a ratchet engaging pawl 50 that is adapted to engage a ratchet 51 that forms a part of the latching and tripping mechanism 33. It will be also here noted that the electro-magnet or coil 20 is connected at one side to the metallic ring 16 by means of a connection 52, and at its other side the electro-magnet or coil 20 is connected to the stationary contact 34 by means of a conductor 53. In other words, the electro-magnet or coil 20 is connected in series circuit between the line terminals 13 and 17 carried by the closure cap 12 and the ring 16 respectively at the upper and lower ends of the insulator 10.

In order to simplify the further description of our device, we have, in Figure 3 of the drawings, diagrammatically illustrated a typical system of distribution in which several of our devices, designated by the numeral 54, are shown as associated with an automatically operating reclosing circuit breaker 55. In this system the reclosing circuit breaker 55 is connected in a main feeder circuit 56 that supplies power from a main power transmission circuit 57 to a number of consumer circuits 58, each one of which is equipped with an isolator 54. Therefore, with respect to any particular consumer circuit 58, it will be seen that one of the isolators 54 will be in series circuits with the main reclosing circuit breaker 55, and as a result, should a fault occur upon any one of these consumer circuits 58, the excessive current flow caused by the fault will become operative to actuate the reclosing circuit breaker 55 and also the latching and tripping mechanism 33 of the corresponding isolator 54. When this occurs, the reclosing circuit breaker 55 will open and immediately reclose the main feeder circuit 56 and at the same time the latching and tripping mechanism 33 of the particular circuit isolating device 54 will be operated through one notch of its operating cycle. Then if the fault is of a continuing nature, the reclosing circuit breaker 55 will again open and reclose, and the latching and tripping mechanism 33 of the isolating device 54 will be again actuated through a second notch of its operating cycle. This notching operation will be continued through a series of reclosing operations of the reclosing circuit breaker 55 or until the latching and tripping mechanism 33 of the isolating device in the faulted consumer circuit has operated to open the consumer circuit 58, as will be explained hereinafter.

Figure 5:
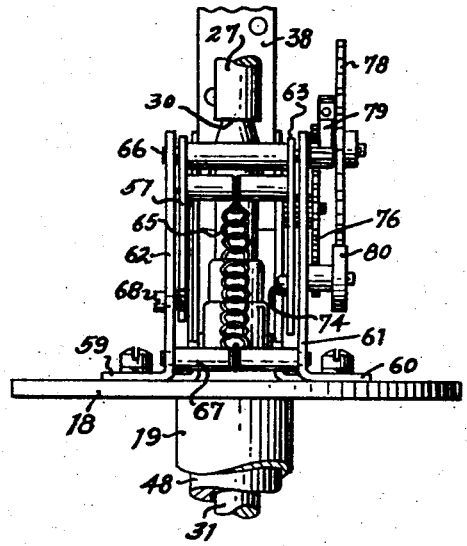
Figure 6:
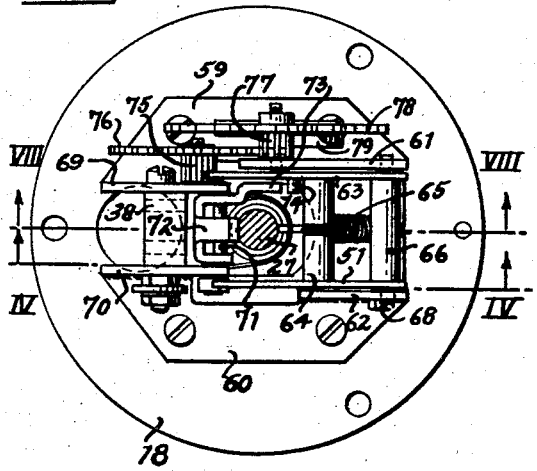
Figure 7:
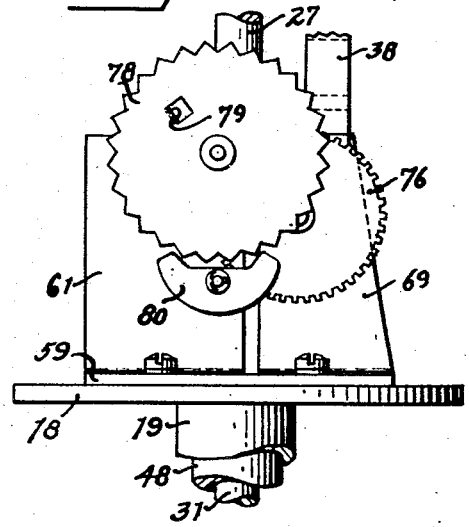

Reference is now made to Figures 4, 5, 6 and 7 of the drawings for a more detailed description of the latching and tripping mechanism 33 which, as described above, is adapted to be set in operation by the ratchet engaging pawl 50 carried by the armature 48. As shown in these views of the drawings, the tripping and timing device 33 is mounted upon two flanged plates 59 and 60, each of which has two offset or disaligned upstanding flanges between and/or upon which the several operating elements of the notching and tripping mechanism are mounted. Pivotally mounted between an upstanding flange 61 carried by the flanged plate 59, and an oppositely disposed upstanding flange 62 carried by the flange plate 60, there is a sector unit which includes the notched sector 51 that moves in an arc at one side of the elongated rod-like member 27, and a gear sector 63 which moves in a corresponding arc at the other side of the elongated rod-like member 27. The sectors 51 and 63 are secured in fixed relation with each other by means of a cross-connection 64 to which one end of a spring 65 is connected, and at their pivotal point they are also secured together so that they operate as a unit about a spindle shaft 66. The lower end of the spring 65 is secured to a tie-bar 67 that extends between the flanged plates 61 and 62. The upstanding flange 62 also carries an adjustable stop pin 68 that is adapted to retain the ratchet sector 51 in its initial operative relation with the pawl 50 and against the downward pull exerted thereupon by the spring 65. This stop pin 68, as shown in Figure 5, is formed by the projecting end of a stud which is threaded through the upstanding flange 62. In order to bias the ratchet engaging pawl 50 into engagement with the ratchet sector 51, there is provided a yoke-like spring which, as will hereinafter appear, extends around an upstanding portion of the armature 48 with its ends projecting through holes formed at the proper angle in a shaft upon which the ratchet engaging pawl 50 is secured. In addition to the upstanding flanges 61 and 62, the flange plates 59 and 60 are also respectively provided with additional inwardly disposed upwardly extending flanges 69 and 70 between which the insulating block 38, previously referred to, is secured by the bolts 39. In addition to forming a support for the insulating block 38, these latter upstanding flanges 69 and 70 also provide a support for a transversely extending shaft 71 upon which a notch engaging latch 72 is pivotally mounted at a point where it will engage the notch 30 in the elongated rod-like member 27. This latch 72 also has an inwardly extending arm 73 that is adapted to be engaged by a pin 74 which is carried by and projects from the inside of the gear sector 63. As will hereinafter appear, this pin 74 will become effective to trip the latch 72 and permit the elongated rod-like member 27 to drop by gravity and open the circuit between the stationary contact 14 and the moving contact 29 when the timing and tripping mechanism 33 has completed a full cycle of operations. Mounted upon the outside of the upstanding flange 69, by means of a stub shaft, there is a pinion 75 that is adapted to be driven by the gear sector 63 as it swings upwardly with the notched sector 51, and connected to the pinion 75 there is a larger gear wheel 76 that meshes with a second pinion 77. This pinion 77 is in turn adapted to drive an escapement star wheel 78 with which it is connected by means of a one-way drive established through a spring finger 79. As is more clearly shown in Figure 7 of the drawings, the movements of the star wheel 78 are also adapted to be timed in a step-by-step manner by means of an oscillating escapement member 80 which has a predetermined fixed period of oscillation, as determined by the forces applied thereto by the spring 65. In this connection it will be noted that the angular disposition of the spring 65 is such that it will provide for a substantially uniform application of force to the ratchet and gear sector unit when the escapement is in operation. At the same time this disposition of the spring 65 also provides for a substantially uniform load upon the armature 48 during each of its operating strokes.

Upon now referring to Figure 8 of the drawings, it will be seen that the armature 48 is provided with enlarged shoulder portions 81 that are adapted to engage the upper side of the plate 18 and thus limit its downward movement when under the influence of magnetic attraction exerted by the electromagnet 20. Immediately above these shoulder portions 81 the armature 48 is also provided with a laterally extending boss 82 through which a shaft 83 extends and upon which the ratchet engaging pawl 50 is secured. The shaft 83 extends at each side of the laterally extending boss 82, and projecting through its extending ends at an angle are the ends of a yoke-like spring 84 which, as previously stated, operates to bias the ratchet engaging pawl 50 into engagement with the ratchet sector 51. In addition to forming a support for the shaft 83, the boss 82 also serves as a guide which will prevent a turning of the armature 48. This is due to the fact that the boss 82 moves between the upstanding flanges 69 and 70 and thus prevents a turning of the armature 48 and/or a consequent disalignment between the ratchet engaging pawl 50 and the ratchet sector 51. The armature 48 is here shown as also having an upwardly extending collar 85 that serves to guide the elongated rod-like member 27 centrally therethrough. At the same time, this collar 85 will prevent the shouldered portion 32 of the elongated rod-like member 27 from hanging up on the top of the armature, as might occur if this collar 85 were not provided. In this figure of the drawings it will also be noted that the notch engaging latch 72 is formed integrally with its operating arm 73 so that when the latter is engaged by the pin 74 upon the gear sector 63, the latch 72 will be moved outwardly clear of the elongated rod-like member 27 and thus permit the rod-like member 27 to drop by gravity and open the circuit between the cooperating contacts 14 and 29. As here shown, the spring finger 79, previously referred to as forming a one-way driving connection between the pinion 77 and the star wheel 78, is secured at its outer end to an ear 86 that is bent out at one side of the star wheel 78. At its free end this spring finger 79 engages the teeth of the pinion 77 and it is so disposed that it will permit the pinion 77 to rotate clockwise freely of the star wheel 78, as when the notched ratchet sector 51 and the gear sector 63 are operated in their upward swing by the armature 48 through the medium of the ratchet engaging pawl 50. During the reverse or downward swing of the gear sector 63, however, this spring finger 79 will operate to connect the star wheel 78 to the gear sector 63 and the ratchet sector 51 and thus delay or retard their return movement under the influence of the tension spring 65 as the armature 48 returns to its initial inoperative position.

The operation of our device can be best explained with particular reference to Figures 1, 4 and 8 of the drawings. In this connection it will be understood that when our device is first installed in a circuit, it will be placed in operation by a manual closing of the contacts 14 and 29 through a setting of the elongated rod-like member 27 in its elevated and latched position by means of an operating pole, the upper end of which will be placed in engagement with the cup-like disc 26 at the lower end of the isolator. If it is now assumed that normal current conditions exist in the circuit, current will flow from the line terminal 13 through the stationary contact 14 to the moving contact 29 and along the current conducting sleeve 42 to the spring finger contacts 36 of the second stationary contact 34 and thence, by way of the conductor 63, to the electromagnet or coil 20 and through the conductor 62 to the terminal 17 which, as suggested above, is connected to the other side of the circuit. Now, if current conditions are normal in the circuit, the armature 48 will not be attracted by the electromagnet 20, but will be held, as shown in Figure 1, in its elevated position by the compression spring 49, and the ratchet sector 51, with its associated gear sector 63, will be held in their lowermost position against the stop 66 by the action of the tension spring 65. Under the assumed conditions, the parts will remain in this position as long as no fault or abnormal current condition occurs in the circuit protected by the circuit isolating device. Now, if it is assumed that the circuit being protected becomes faulted or is otherwise excessively overloaded, this additional current, acting through the electromagnet 20, will cause the armature 48 to be pulled downwardly and into the position shown in Figures 4 and 8 of the drawings. At the same time, this excessive current flow will also be impressed upon the tripping device of the main automatic reclosing circuit breaker 55 which, as is shown in Figure 3 of the drawings, is connected in series with one or more of our devices and, as a result, the main reclosing circuit breaker 55 will automatically open its contacts. This will deenergize the electromagnet 20 and permit the compression spring 49 to move the armature 48 upwardly and, through the medium of the ratchet engaging pawl 50 carried thereby, cause the ratchet sector 51 and the gear sector 63 to swing upwardly through a predetermined angle against the action of the spring 65 until the ratchet engaging pawl 50 becomes disengaged therewith, as will hereinafter appear. During this upward swing of the gear sector 65, the pinion 75 will be caused to turn and drive the gear wheel 76 which operates through the pinion 77 to drive the star wheel 78 of the timing mechanism. But, in this operation it will be noted that the pinion 77 will be free to move clockwise under the spring finger 79 without turning the star wheel 78 and introducing a timing delay in this particular movement of the gear sector 63 or the ratchet sector 51. But, as soon as the ratchet sector 51 and the gear sector 63 are released by the ratchet engaging pawl 50, a driving force will be applied by the spring 65 which will cause the pinion 75 and the gear wheel 76 to rotate the pinion 77 in a reverse direction, and the spring finger 79 will now come into play and cause the star wheel 78 to rotate slowly, as will be determined by the action of the oscillating escapement member 80 which is associated therewith. As a result, the ratchet sector 51, with the gear sector 63, will now be permitted to move slowly in a reverse direction toward their initial position against the stop pin 66 carried by the flange 62 of the flange plate 59. During this interval of operation, however, it will be understood that the automatic reclosing circuit breaker 55 will have operated to reclose the feeder line circuit 56 in which it is connected, and if current conditions are then normal, the circuit breaker 55 will remain closed and the latching and tripping member 33 of a particular isolating device 54 will return to its original condition. But, should it happen that the fault is still on the line, the main reclosing circuit breaker 55 will again open. However, at the time of this first reclosing operation of the reclosing circuit breaker 55, the same fault or overload current will have been impressed upon the electromagnet 20 and the armature 48 will have been again pulled down and released. Then, because of the retarding action of the star wheel 78 and the oscillating escapement member 80, the ratchet sector 51 will not have had time to return to its initial position and, as a result, upon the second opening of the automatic reclosing circuit breaker, the ratchet engaging pawl 50 will engage the second notch of the ratchet sector 51 and cause it to advance through a further angle of movement. This operation may be continued for as many steps as are provided for by notches in the notched ratchet sector 51. When the device is constructed as here illustrated, with three notches or steps in the ratchet sector, it will be understood that the latching and tripping mechanism 33 will become operative to open the circuit through the contacts 14 and 29 after the main reclosing circuit breaker has opened the feeder line circuit 56 a total of three times, after which it will be understood that any further reclosing of the main reclosing circuit breaker 55 will reestablish service in the remaining portions of the distribution system and leave the faulted circuit out of service through the opening of the circuit through the contacts 14 and 29 of the isolator which has been subjected to the fault.

A further novel and important feature of our device, and one which makes the above operations possible, may be better explained with reference to Figures 9, 10 and 11 of the drawings. In these latter figures there is shown three stages of operation which occur during the first and second notching operations of the ratchet engaging pawl 50 upon the ratchet sector 51. As here shown, the ratchet sector 51 is provided with three notches, designated by the numerals 87, 88 and 89, into which the upper end of the ratchet engaging pawl 50 is adapted to operate as the ratchet sector 51 is advanced toward its latch tripping position where the pin 74 upon the gear sector 63 will engage the lever 73 and move the latch 72 out of latching relation with the notch 30 in the elongated rod-like member 27 which carries the moving contact 29. From the preceding description it will be understood that when the isolator is closed and normal conditions exist upon the circuit to be protected, the ratchet engaging pawl 50 will be held in its uppermost position by the spring 49, as shown in Figure 1. At the same time, the armature 48 will be in a corresponding elevated position. Therefore, when the electromagnet 20 is subjected to a flow of excessive current, as might result from a fault upon the circuit, the armature 48 will be drawn down and carry the ratchet engaging pawl 50 into the position shown in Figure 4 of the drawings. This will occur upon the first flow of a fault current and at a time immediately preceding the first opening operation of the main automatically operating reclosing circuit breaker 55 through which the faulted circuit is connected to the main source of power. Under these conditions, the spring 49 will be compressed and in a condition to move the ratchet engaging pawl 50 upward immediately upon the failure of the flow of excessive current through the electromagnet or coil 20, as will be the case when the main circuit is opened by the initial circuit opening operation of the reclosing circuit breaker 55. This opening of the main circuit through the reclosing circuit breaker 55 will deenergize the electromagnet 20 and, as a consequence, the armature 48 will be freed to move upwardly under the influence of the compression spring 49. At the beginning of this upward movement, the armature 48 and the ratchet engaging pawl 50 will be in the position shown in Figure 4 of the drawings, and as the armature 48 travels upwardly, the upper end of the pawl 50 will engage the notch 87 of the ratchet sector 51 and cause the latter to move upwardly in the direction of arrow until the pawl 50 becomes disengaged from the notch 87, as indicated in Figure 10 of the drawings. Then, while the ratchet engaging pawl 50 may still make a slight additional upward movement, the ratchet sector 51 will immediately begin to swing back or counter-clockwise, as here indicated by the arrow thereupon. But, in its backward or counter-clockwise swing, the ratchet sector 51 will be retarded by the timing function of the star wheel 78 and its oscillating escapement member 80 so that should the main reclosing circuit breaker reclose and again reopen, the ratchet engaging pawl 50 will become engaged in a similar manner with the notch 88 upon the ratchet sector 51. Then, should the fault or overload condition be of a continuing nature, a similar operation will take place with respect to the notch 89 of the ratchet sector 51. As indicated in Figures 10 and 11 of the drawings, to insure the disengaging action between the pawl 50 and the ratchet sector 51, the ratchet engaging pawl 50 is so shaped that the extending portions of the ratchet sector 51, which trail the notches 87, 88 and 89 thereupon, are adapted to move the pawl 50 outwardly so as to free the ratchet sector 51 immediately after each notching operation thereof. An advantage obtained by this arrangement is that the ratchet sector 51 will also be released and free to return to its initial position following a tripping of the latch 72 and the consequent opening of the circuit between the contacts 14 and 29 of the isolator. In other words, our improved isolator is capable of resetting itself for a subsequent cycle of successive operations whenever it is reconnected into the circuit by a manual relatching of the elongated rod-like member 27 in its elevated position with the contacts 14 and 29 in engagement with each other.

The above description of the operation of our isolating device has been based on the assumption that the isolator will become effective to open and isolate the faulted circuit upon the third circuit opening operation of the main reclosing circuit breaker 55. But, it will be understood that this cycle of operations may be shortened by merely moving the stop pin 68 inwardly upon the upstanding flange 62 to a point where the notch 88 or the notch 89 will be held in a position corresponding to that of the notch 87 when the device is operating under normal current conditions. To provide for such a shortening of the operating cycle, the upstanding flange 62 is shown in Figure 1 of the drawings as having additional threaded holes 90 and 91 in which the stop pin or stud 68 may be positioned. When the stop pin 68 is positioned in the hole 90, the ratchet engaging pawl 50 will engage the notch 88 on the ratchet sector 51 and the device will operate to isolate the circuit upon a second opening of the main reclosing circuit breaker 55. By the same token, when the stop pin 68 is positioned in the hole 91, the ratchet engaging pawl 50 will immediately engage the notch 89 and thus become operative to trip the latch 72 and open the circuit through the isolating device upon the first opening operation of the main reclosing circuit breaker 55.

In closing, it should be added that while we have shown the moving contact 29 as connected to one side of the electromagnet or coil 20 through the tubular extension 42 and the stationary contact 34, it will be understood that the moving contact 29 may be connected directly to the end of the electromagnet or coil 20 by a flexible pigtail connection. However, it has been found that such a connection is open to the objection that it may become entangled or wound about the elongated rod-like member 27 and thus interfere with its proper operation. As an additional objection, the provision of such a loose conductor within the insulator 10 has a tendency to set up radio interference. On the other hand, with the arrangement as here shown, it will be seen that the possibility of radio interference is removed and, at the same time, the elongated rod-like member 27 will be free to turn and thus insure a good contact between the surfaces of the contacts 14 and 29 which will result in a longer life.

While we have, for the sake of clearness and in order to disclose the invention so that the same can be readily understood, described and illustrated specific devices and arrangements, we desire to have it understood that the invention is not limited to the specific form disclosed, but may be embodied in other ways that will suggest themselves to persons skilled in the art. It is believed that this invention is new and it is desired to claim it so that all such changes as come within the scope of the appended claims are to be considered as part of this invention.

Having thus described our invention, what we claim and desire to secure by Letters Patent is—

1. In a permanent fault circuit isolating device, the combination of an insulating support having spaced circuit terminal members, a stationary contact member carried by one of said terminal members, a movable contact member adapted to cooperate with said stationary contact, means for operatively mounting said movable contact upon the other of said terminal members comprising an elongated rod-like member having a notch intermediate its ends by which it may be latched in a predetermined position with said movable contact in engagement with said stationary contact member, an armature slidably mounted to move freely upon said rod-like member and biased into an inoperative position, an electro-magnet connected in series circuit with said movable contact member and associated with said armature, a latch engaging the notch in said rod-like member for holding said contacts in engagement, a ratchet mechanism adapted to operate in a step by step manner in response to movements of said armature and after a predetermined number of successive operations thereof to trip said latch and permit said rod-like member to move and open the circuit between said movable and stationary contact members, means tending to reset said ratchet mechanism after each step by step movement thereof, and a timing means operative to delay the resetting of said ratchet mechanism by said last means, whereby said ratchet mechanism will be rendered inoperative to trip said latch and permit an opening of the circuit between said stationary and movable contacts when the successive operations of said armature do not occur within a predetermined period of lapsed time.

2. In a branch circuit isolating device for use with an automatic reclosing circuit breaker, the combination of a supporting insulator having spaced circuit terminal supporting members at its ends, a stationary contact carried by one of said supporting members, a movable contact adapted to cooperate with said stationary contact, means for operatively mounting said movable contact member upon the other of said terminal supporting members comprising a rod-like member having a notch intermediate its ends and adapted to be manually moved to and latched in a predetermined position with said movable contact in engagement with said stationary contact, a latch adapted to engage the notch in said rod-like member and hold said moving contact in a circuit closed position against said stationary contact, and armature slidably mounted upon said rod-like member, spring means for moving said armature in a ratchet operating direction, an electro-magnet connected in series circuit with said movable contact member adapted to attract said armature and load said spring means with operating energy in the event of an overload on the line, and a ratchet mechanism having a latch tripping member operated in a step by step manner in response to movements of said armature under the influence of said spring adapted after a predetermined number of successive operations of said armature to trip said latch and permit said rod-like member to move and open the circuit between said movable and stationary contact members.

3. A permanent fault isolator comprising a substantially cylindrical insulating support having a stationary terminal contact at its upper end, a plate-like closure means at the lower end of said insulating support, an axially extending movable contact carrying member extending through said plate-like closure means, an electro-magnet mounted upon said plate-like closure means having a connection with a line terminal carried by said plate-like means, a latch operative to retain said movable contact carrying member in an elevated position against the action of gravity, an armature operatively associated with said electro-magnet slidably mounted upon said movable contact carrying member, a notching pawl carried by said armature, a spring means for holding said armature in an elevated position with respect to said electro-magnet under normal current conditions, whereby under abnormal conditions said armature will be moved against the action of said spring means and carry said notching pawl into a ratchet engaging position, a timing means having a ratchet means into which said notching pawl may engage, and a latch releasing means operating in response to movement of said ratchet means adapted after a predetermined number of notching operations of said ratchet means to release the said movable contact carrying member to permit an opening of the circuit.

4. In a tripping device for a permanent fault isolator adapted for use with an automatic reclosing circuit breaker, the combination of circuit controlling contacts, a latching means normally operating to hold said contacts in a closed circuit condition, an electro-magnet connected in series circuit with said contacts, an armature adapted to be attracted by said electro-magnet in the event of an abnormal current upon said contacts, spring means for biasing said armature in an inoperative position under normal current conditions, a ratchet mechanism adapted after a predetermined number of successive step by step operations to render said latching means inoperative to hold said contacts in a closed circuit condition, a ratchet engaging pawl carried by said armature for operating said ratchet mechanism, characterized by the fact that said ratchet engaging pawl and said ratchet mechanism are adapted to become disengaged at a point short of the end of each operating stroke of said ratchet engaging pawl, a second spring means tending to return said ratchet mechanism to its initial position after each release thereof, and a timing means for retarding the return of said ratchet mechanism to its initial position, whereby a succession of operating strokes of said ratchet engaging pawl within a predetermined period of lapsed time will be required to effect a release of said latching means by said ratchet mechanism.

ROY H. GERARD.
ROY M. SMITH.

REFERENCES CITED

The following references are of record in the file of this patent:

UNITED STATES PATENTS

| Number | Name | Date |
|---|---|---|
| 1,402,898 | Schwerin | Jan. 10, 1922 |
| 1,737,649 | Edsall | Dec. 3, 1929 |
| 1,805,032 | Edsall | May 12, 1931 |
| 1,982,986 | Garlington | Dec. 4, 1934 |
| 2,287,676 | Frank et al | June 23, 1942 |
| 2,334,339 | Lemmon | Nov. 16, 1943 |
| 2,387,372 | Watkins et al. | Oct. 23, 1945 |
| 2,387,373 | Watkins et al. | Oct. 23, 1945 |